United States Patent [19]
Hobrath

[11] Patent Number: 5,813,679
[45] Date of Patent: Sep. 29, 1998

[54] MOWER SULKY WITH AUTOMATIC SEAT ADJUSTMENT

[75] Inventor: Gerald Hobrath, Brunswick, Ohio

[73] Assignee: MTD Products Inc, Cleveland, Ohio

[21] Appl. No.: 744,354

[22] Filed: Nov. 4, 1996

Related U.S. Application Data

[63] Continuation of Ser. No. 258,945, Jun. 13, 1994, abandoned, which is a continuation-in-part of Ser. No. 176,249, Jan. 3, 1994, abandoned.

[51] Int. Cl.$^6$ .................................................. B62D 63/00
[52] U.S. Cl. ........................ 280/32.7; 56/323; 172/433; 172/435; 280/760
[58] Field of Search .................................. 280/32.7, 204, 280/202, 14.2, 424, 492, 493, 494, 47.11, 760, 769; 180/19.1; 172/257, 431, 433, 434, 435; 56/228, 323, DIG. 10

[56] References Cited

U.S. PATENT DOCUMENTS

| | | | |
|---|---|---|---|
| 521,547 | 6/1894 | Poole | 172/435 |
| 527,978 | 10/1894 | Heller | 172/435 |
| 534,643 | 2/1895 | Ham | 172/435 |
| 542,133 | 7/1895 | Beyer | 172/435 |
| 2,218,064 | 10/1940 | Amsbury | 280/32.7 |
| 2,452,280 | 10/1948 | Zahller | 280/760 |
| 4,192,525 | 3/1980 | Clark | 280/32.7 |
| 5,463,853 | 11/1995 | Santol et al. | 280/32.7 |

FOREIGN PATENT DOCUMENTS

| | | | |
|---|---|---|---|
| 0177057 | 5/1953 | Austria | 172/257 |
| 0947903 | 7/1949 | France | 280/32.7 |
| 0638436 | 4/1962 | Italy | 280/32.7 |

*Primary Examiner*—Anne Marie Boehler
*Attorney, Agent, or Firm*—Roger D. Emerson

[57] ABSTRACT

A sulky for a self propelled lawn mower, the sulky being interconnected by a pivot frame and a horizontal pivot to the mower frame, and a parallelogram link structure to mount the seat to the sulky for automatic adjustment of the seat to lawn mower distance as the mower moves over uneven ground.

19 Claims, 5 Drawing Sheets

MOWER SULKY WITH AUTOMATIC SEAT ADJUSTMENT

This application is a continuation of application Ser. No. 08/258,945 filed on Jun. 13, 1994, now abandoned, which is a continuation-in-part of Ser. No. 08/176,249, filed Jan. 3, 1994, now abandoned.

FIELD OF THE INVENTION

BACKGROUND OF THE INVENTION

Self powered lawn mowers have been in use for a significant period of time. Typically, these mowers comprise a frame having power driven wheels, rearwardly extending handlebars, and a mowing deck. By selectively manipulating the controls on the handlebars, the operator can cause this self propelled mower to selectively go forward or reverse, turn, and accomplish basic mowing functions. An example includes U.S. Pat. No. 4,920,734. In certain applications, for example lawn care professionals, the operation of these mowers can be quite tiring due to the fact that the operator must continually walk behind such lawn mowers. For this reason, sulkies may be provided. When these sulkies are interconnected to the lawn mower frame, they allow the operator to be propelled by the lawn mower. This eliminates the necessity of his walking behind same. Examples of commercial sulkies include the sulky marketed under the name Velke as reflected in Velke U.S. Pat. No. 5,004,251 issued Apr. 2, 1991, Sulky Apparatus Attachable To A Self Propelled Power Mower and Herr U.S. Pat. No. 3,485,314, Article Caring Vehicle With Optional Storable Riding Attachment. These prior art sulkies are advantageous in that they allow the operator to ride in relative comfort behind the self propelled mower. The problem with them is, however, when a turn is accomplished, both of them severely inconvenience the operator. This inconvenience occurs because the operator is displaced from his positioning directly behind the handlebars. Further, in at least the Velke patent, it is possible for the operator to be forced off the apparatus due to a jackknifing effect. This limits the utilization and convenience of these prior art sulkies. In addition to the above, sulkies can require the operator to stand during operation of the lawn mower.

OBJECTS AND SUMMARY OF THE INVENTION

It is an object of the present invention to provide for a convenient, useable sulky.

It is another object of the present invention to provide for an adaptable sulky.

It is yet another object of the present invention to retain the operator in an operative position in respect to the handlebars under all operative conditions of the sulky.

It is still another object of the present invention to increase the comfort level for operators of powered lawn mowers.

It is an object of the present invention to provide a sit down sulky.

It is also an object of the present invention to provide for an easily removable sulky.

It is yet a further object of the present invention to increase the usability of sulkies for lawn mowers.

Other objects and a more complete understanding of the invention may be had by referring to the following description and drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

Figure 1:
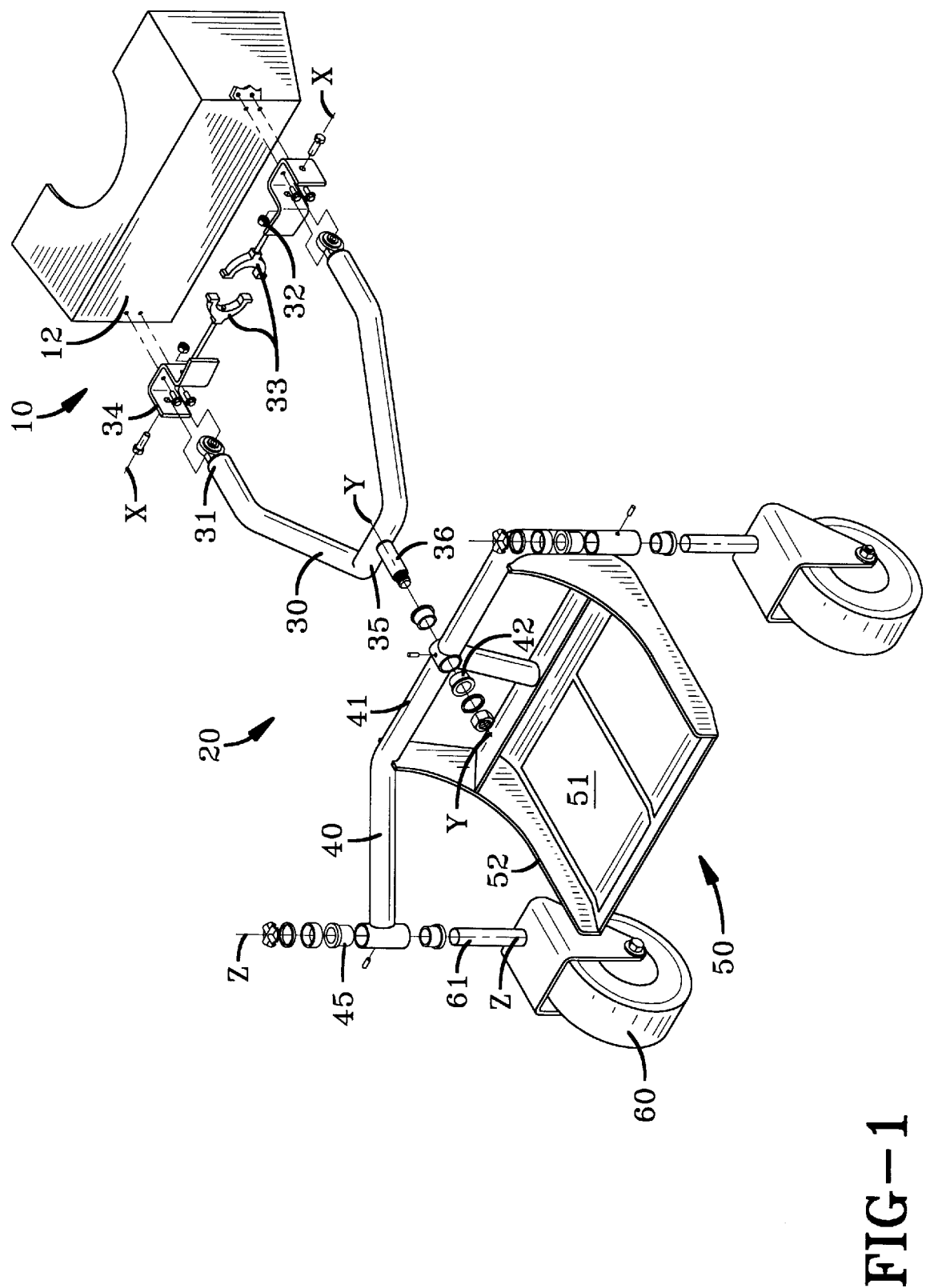
FIG. 1 is a perspective view of a sulky in a partially disassembled plan view incorporating the sulky pivot orientation in a stand up sulky.

This invention relates to a sit down sulky for powered devices. The invention will be described in its preferred embodiment of a sulky for a self powered commercial lawn mower.

The lawn mower disclosed is a Cub Cadet mower. This device includes a frame 10 which supports an engine (not shown) and a forwardly extending mower deck (not shown). The frame itself is supported on two pairs of fore and aft displaced wheels so as to provide a constant support for the mower frame 10 (wheels not shown). The rear wheels are power driven by a hydrostatic transmission to the engine. The direction and speed of the lawn mower is under the control of the operator by the manipulation of the handlebars 11 together with the controls thereon. In this mower, the speed and direction are controlled by two clutches, one for the left rear wheel and the other for the right rear wheel. This allows for turns to be accomplished without physically moving the mower via the handlebars. This particular mower is given as an example. Other self powered devices could be substituted.

The invention of this application relates to the sulky 20. This sulky 20 includes a pivot frame 30, a sulky frame 40, and a sulky stand 50.

The pivot frame 30 is for interconnecting the front section 41 of the sulky frame 40 to the back 12 of the mower frame while simultaneously providing a horizontal "X" axis pivot that allows the sulky frame 40 to move angularly upwards and downwards in respect to the mower frame 10. The pivot frame 30 in addition spaces the front section 41 of the sulky frame by the appropriate distance from the back 12 of the mower frame 10. The appropriate distance is determined by operator comfort in respect to the distance 13 that the handlebars extend rearwardly of the back 12 of the mower frame. This provides for operator comfort when the operator is on the sulky stand 50.

In the standing embodiment (FIGS. 1–3), the horizontal "X" axis pivot is at the front end 31 of the pivot frame 30. The particular pivot disclosed are ball ends 32 on the front end of the pivot frame 30, which ball ends pivot about removable pins 33 to two brackets 34 which are interconnected to the back 12 of the mower frame 10. The pins 33 allow the pivot frame 30 to pivot about the brackets 34, thus allowing the sulky stand 50 to float upwards and downwards in respect to the mower frame 10. The ball ends 32 allow for compensation for any angular misalignment between the holes in the brackets 34 and the holes in the ball ends 32, thus facilitating assembly. The removable pins 33 allow for easy removal of the sulky for use of the mower without the sulky, transport, storage, etc.

In the preferred sitting embodiment of the invention (FIGS. 4–7), the horizontal "X" axis pivot is again at the front end 131 of the pivot frame. The particular pivot disclosed uses a quasi cylindrical sideward extending member 132 in combination with laterally spaced brackets 135 which extend downwardly off of a foot rest 133. The foot rest 133 is itself physically bolted to the sides and back of the mower frame 10 so as to rigidly interconnect the foot rest 133 to the mower. The particular pivot disclosed uses a rod 136 which extends through bearings on the quasi cylindrical member 132 and the holes in the brackets 135. The rod 136 shown is held in place by bolts 139. This interconnection allows the pivot frame 30 to pivot around the brackets 135, thus allowing the sulky stand 50 to float upwards and downwards in respect to the mower frame. The use of the rod 136 allows for the removal of the sulky from the mower for transport and storage by removing the bolts 139. (The foot rest 133 does not extend far enough backwards by itself in order to compromise the manual operation of the mower 10 without the sulky. Other methods of attachment are also possible.) A slot in the foot rest allows a greater degree of angling between the pivot frame 30 and the mower 10 than otherwise. Two shields 134 are located on either side of this slot to help locate the operator's feet on the foot rest 133.

To increase the side to side stability of the horizontal "X" axis pivot in both embodiments, it is preferred that the brackets 34, 135 be at least two in number and widely spaced as shown. This maximizes the side to side stability between the mower frame 10 and the sulky stand 50. Due to the preferred locating the horizontal "X" axis pivot on the back 12 of the mower frame 10, the longitudinal angular pivoting of the sulky stand 50 is minimized for a sulky 20 having a given length (for example in contrast to locating the horizontal "X" axis pivot at the back end 35 of the pivot frame 30 with the front end 31 fixedly interconnected to the back 12 of the mower frame 10). This minimization of the longitudinal angular pivoting is preferred for operator convenience and comfort.

In both the preferred embodiments disclosed, the front section 41 of the sulky frame is interconnected to the back end 35 of the pivot frame 30 by an optional horizontal "Y" axis pivot. This horizontal "Y" axis pivot allows the sulky stand 50 to float angularly sideways of the mower frame 10, thus reducing the torsion on the pivot frame 30 and sulky frame 40. This increases the service life of the sulky 20 for components of the given size.

Figure 2:
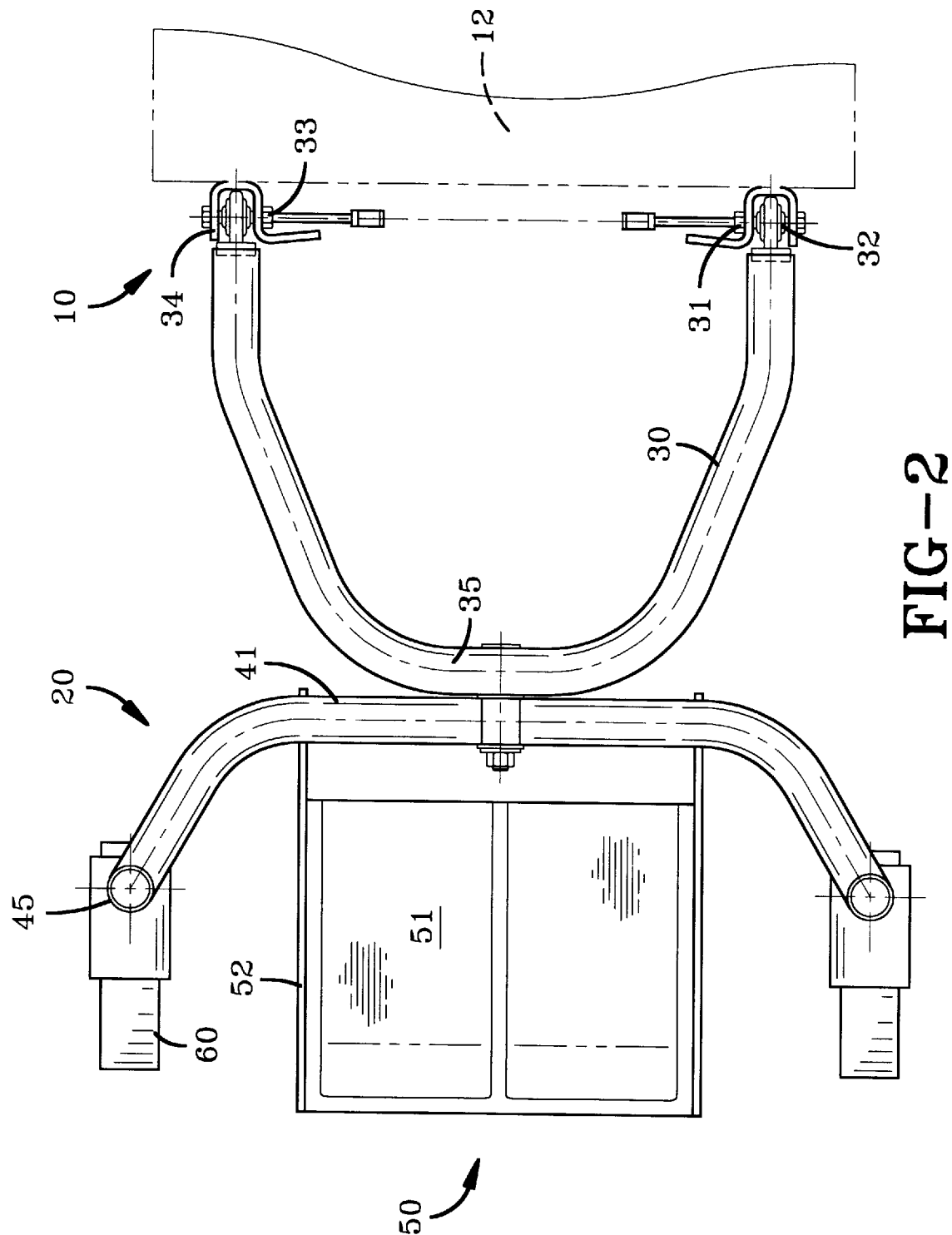
FIG. 2 is a downward looking view of the sulky of FIG. 1.
Figure 3:
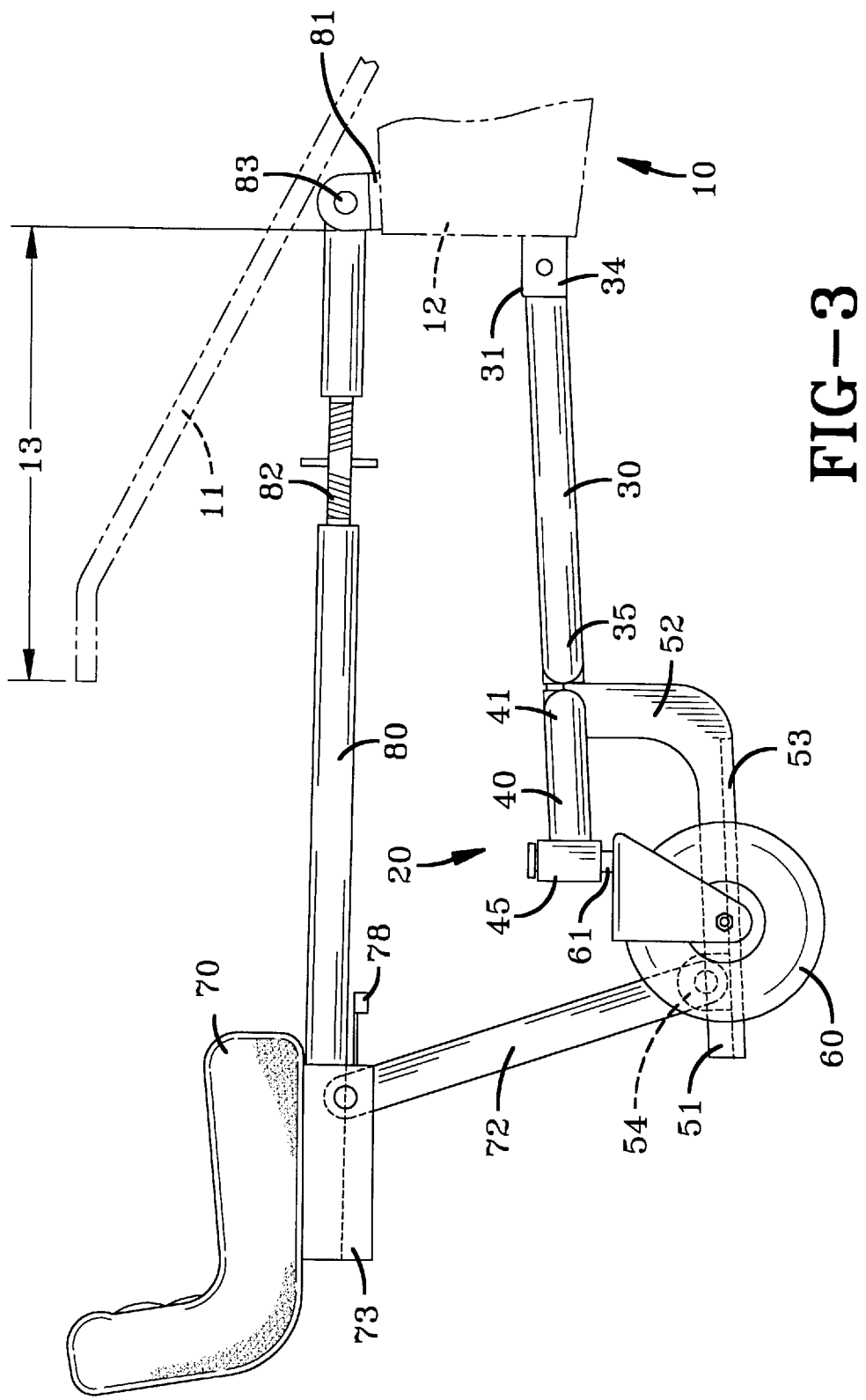
FIG. 3 is a side view of the sulky of FIG. 1 with optional seat attachment incorporating the invention of the application.
Figure 4:
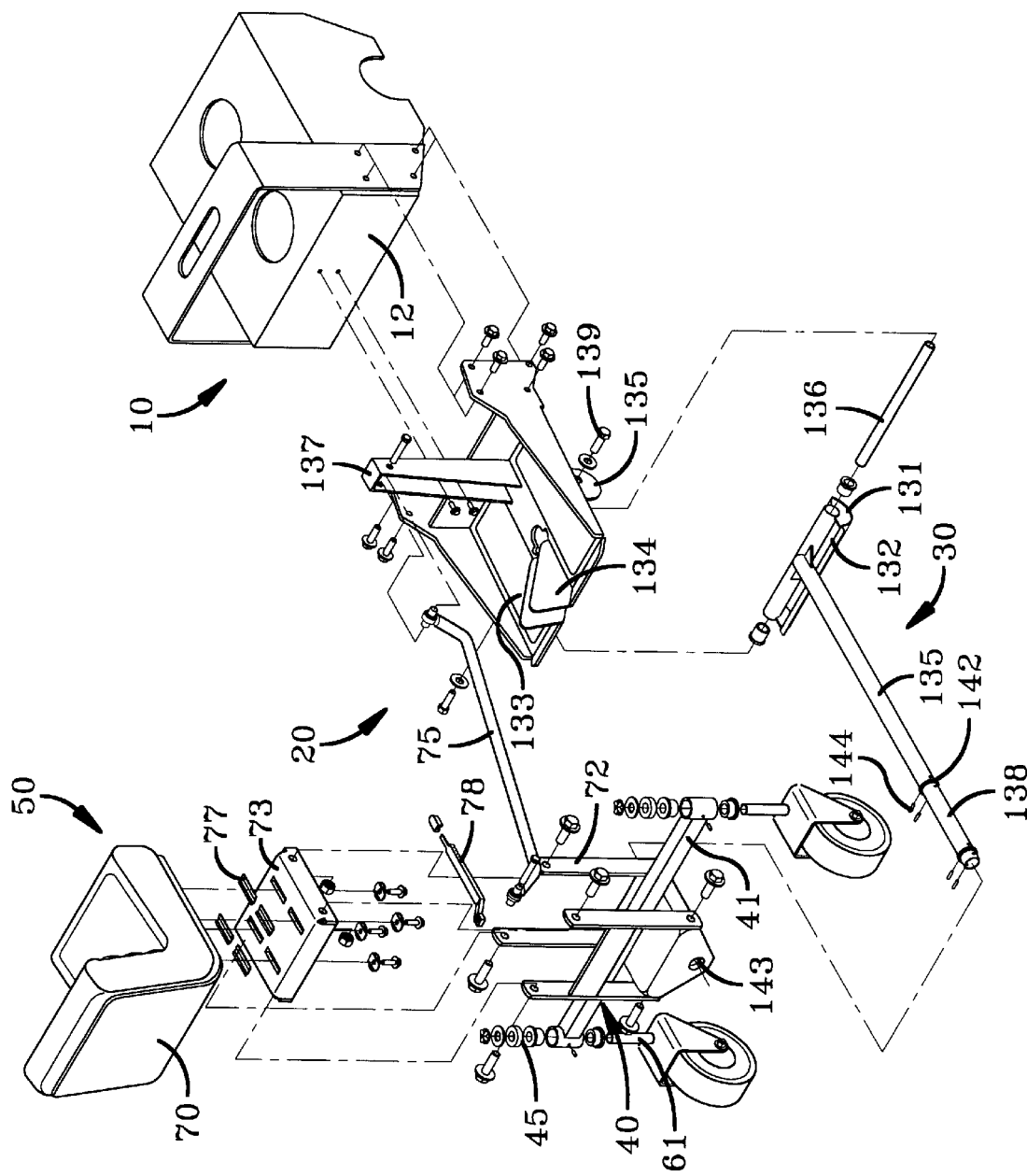
FIG. 4 is a perspective view of a sit down sulky in a partially disassembled plan view incorporating the invention of this present application; and, FIGS. 5–7 are side views of the sulky of FIG. 4 during various operating conditions.
Figure 5:
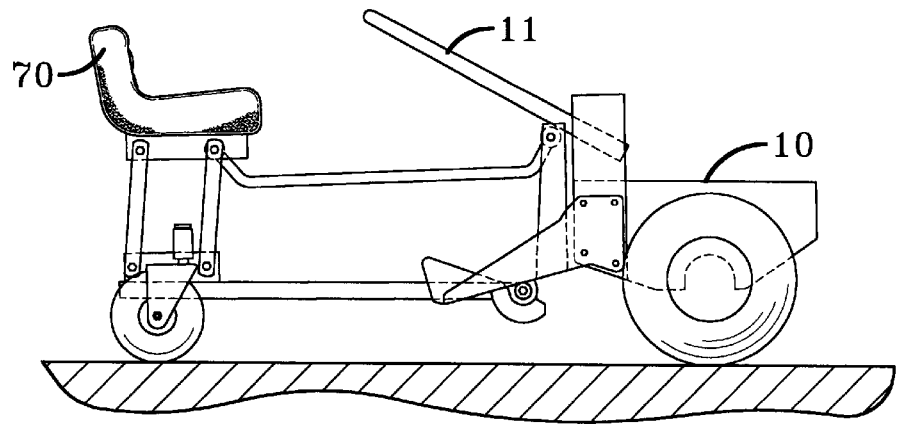
Figure 6:
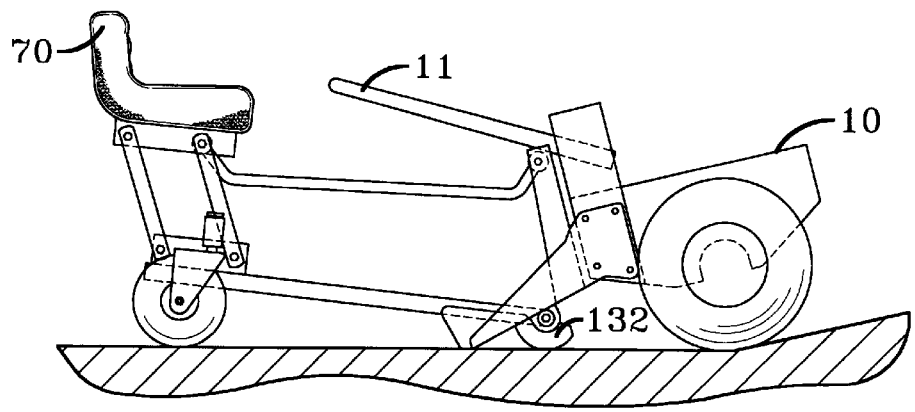
Figure 7:
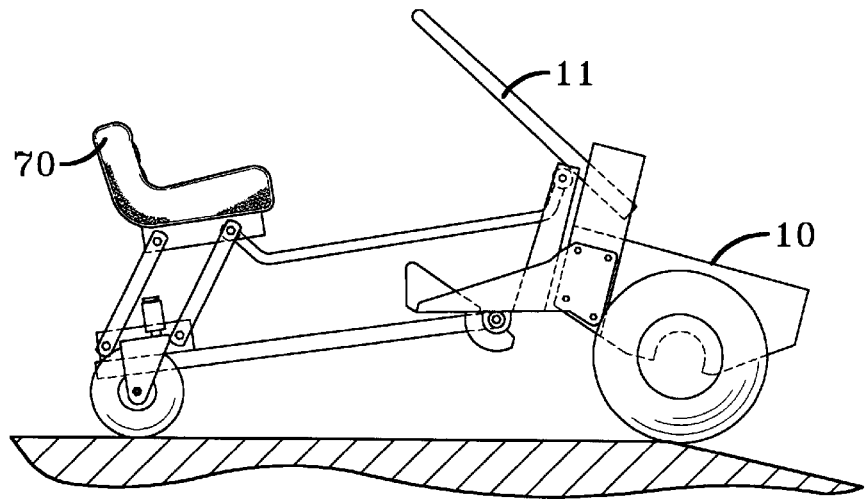

The preferred "Y" axis pivot disclosed in the standing embodiment of FIG. 1–3 is a pin 36 extending longitudinally backwards off of the back end 35 of the pivot frame in combination with a bearing 42 in a hole on the front section 41 of the sulky frame 40. The combination of this pin 36 and bearing 42 allow the sulky frame 40 to laterally rotate in respect to the pivot frame 30. The pin 36 and bearing 42 in addition interconnects the sulky frame 40 to the pivot frame 30 so that the sulky frame 40 is interconnected to the mower frame 10 for travel over the ground. Note that this pin 36 and bearing 42 in addition interconnect the sulky frame 40 to the pivot frame 30 during turning of the mower. The pin 36 and bearing 42 combination should be sized in recognition of these high angular forces.

The preferred "Y" axis pivot disclosed in the seated embodiment of FIGS. 4–7 is the trailing end 138 of the pivot frame 30 in combination with two bearings 142 in two holes 143 through the sulky frame 40. The combination of this section 138 and the bearings 142 allow the sulky frame 40 to laterally rotate in respect to the pivot frame 30. Two rods 144 on either side of the bearings 142 interconnect the sulky frame 40 to the pivot frame 30 so that the sulky frame 40 is interconnected to the mower frame 10 for travel over the ground. Again, the size of the rod 138 is selected in view of the high angular forces at this location during turning of the mower.

In both embodiments, the sulky frame 40 supports the sulky stand 50 for travel over the ground, in addition to interconnecting the sulky stand 50 to the pivot frame 30 and thence the mower frame 10. The particular sulky frame 40 disclosed accomplishes this by two widely spaced wheels 60 on either side of the sulky stand 50. The significant lateral spacing of these wheels provides for a solid support of the sulky stand 50 over uneven ground. Since the sulky frame 40 does not longitudinally angularly shift in respect to the mower frame 10, the wheels 60 are interconnected to the sulky frame 40 by a vertical "Z" axis pivot. This vertical "Z" axis pivot allows the wheels to rotate in respect to the sulky frame 40, thus aligning themselves to the direction of movement of the sulky frame 40 over the ground.

The particular "Z" axis pivot disclosed in both embodiments is accomplished by two off center pins 61 on the wheels in combination with bearings 45 at either lateral side of the sulky frame 40. By offsetting the pin 61 forward in respect to the axis of rotation of the wheels 60, a measure of stability is provided for the wheels. This is preferred. Note that if the horizontal "Y" axis pivot was omitted, it would be possible to use a single wheel 60; two wheels would not be needed to provide any lateral stability for the sulky stand 50. A single wheel could also be successfully utilized with a stand 51 below the wheel rotational axis. The sulky stand 50 provides the physical support for the operator.

In the particular standing embodiment disclosed (FIGS. 1–3), this physical support is provided by a single flat foot stand surface 51 which is fixedly interconnected to the sulky frame 40 by certain side pieces 52. The surface 51 is preferably sufficiently wide and long such that the largest sized operator could be accommodated. Other operator supports could also be utilized, such as an operator seat. This seat would further provide operator comfort.

The particular preferred embodiment of FIGS. 4–7 discloses the operator seat invention of this present application. In this embodiment, a seat 70 is physically mounted above the sulky frame 40 for fore and aft movement in respect thereto. In the embodiment shown, this fore and aft movement is by the upwardly extending links 72. The height that the seat 70 is above the sulky stand 40 is selected such that when the mower 10 is on flat ground, an operator can be seated on the seat in a comfortable position behind the handlebars 11 with the operator feet located on the foot stand 133. This height could be adjustable (not shown). In the particular embodiment disclosed, an upper frame member 73 is interconnected to the top of four links 72 such that a parallelogram is formed between the upper member 73 and the sulky frame 40. An adjustment rod 75 extends between this upper frame member 73 and the mower frame 10 a distance above the ground to tie the two together for common movement. In the preferred embodiment, the connection to the mower frame is indirect via an upwardly extending tower 137 attached to the foot rest 133 and the back 12 of the mower frame 10. Preferably, there are a number of physical attachment locations for this adjustment member 75 in respect to both the upper frame 73 and the upper member 137 and/or the adjustment member 75 has available length capacity. This would allow the operator to locate the gross position of the upper frame member 73 in respect to the back end of the mower 10 in a number of varied positions. The adjustment rod could, however, be of a fixed location and length, particularly if as in the preferred embodiment disclosed, the seat 70 is located on some rails 77 to the upper frame member 73. Upon manipulation of a seat lock 78, the seat 70 can further be adjusted fore and aft in respect to the upper frame member 73, thus further increasing the range of operator adjustments for the seat. This combination of adjustments, while not absolutely necessary, allows for a wide range of operators to be accommodated by the sulky stand and is thus preferred.

Other methods of providing fore and aft movement capabilities and other types of adjustment members to move the seat could be utilized in the invention. This includes a retrofit and/or dual use sulkies. For example, the sulky of FIG. 1 is a standing sulky. This sulky could be modified for use with the invention (FIG. 3). In this particular modification, a pivot plate 53 is removably pinned onto the foot/stand surface 51. Two laterally spaced flanges 54 with holes therein extend upwards off of this plate 52. (If the flanges 54 were far enough apart, they could be integral with the foot stand 51 such that the stand 51 could be utilized as a stand without compromise irrespective of such flanges.) Located above and slightly aft of this plate 53 is the upper frame member 73. An adjustment member 80 is fixedly connected to the bottom side of this upper frame member 73 such that a unitary structure results. The front part of the adjustment member 80 is connected by a removable pin 83 ball joint to a flange 81 fixedly bolted to the frame of the mower 10. A length adjusting screw 82 is intermediate the frame 73 and ball joint. Two pivoting links 72 extend between the flanges 54 on the foot stand and the upper frame member. An adjustable seat 70 completes the assembly.

In use, the operator locates the mower on a flat surface and interconnects the sulky 20 to the back 12 of the mower frame 10 by the pins 33 or rod 136 or adapts the sulky of FIG. 3 appropriately. The operator then starts the mower and stands on the surface 51 or sits in the seat 70 of the sulky. When thus positioned, the operator is located directly behind all of the mower controls which are located on the handlebars 11. The operator then engages the controls to operate the mower with the power driven mower pulling the operator on the sulky 20 across the ground. Whether the operator is going straight or turning the mower, the operator maintains his same relative position in respect to the handlebars 11. This is true whether the operator is going straight, reverse, or turning. This constant location facilitates operator control of the lawn mower as well as operator comfort. In that in the preferred embodiment disclosed, the horizontal "X" axis pivot is located far forward, any longitudinal angular shifting of the sulky stand 50 is minimized. This further assists the operator in control of the mower. If the operator wants to remove the sulky 20 for unfettered manual operation, transportation, etc., a quick pull on the removable pins 33 or removing the two bolts 139 that retain rod 136 drops the sulky until next time.

In the seated sulky of FIGS. 4–7 incorporating the invention of this present application, the parallelogram interconnection between the operator seat 70 and the sulky frame 40 allows for the relative angular shifting of the handlebars 11 to be compensated for. (This angling will occur while the lawn mower is being driven over uneven ground.) The parallelogram does this by automatically moving the seat 70 backwards to increase the relative distance between the seat 70 and handlebars 11 when the lawn mower is going uphill (FIG. 6) while moving the seat 70 forwards to reduce the distance when the lawn mower is going downhill (FIG. 7) (distances set forth relative to a non-adjusting seat). This increases operator comfort and the physical control of the vehicle. Note that when the lawn mower is beginning to go uphill (FIG. 6), the quasi cylindrical sideward extending member 132 can also function as a skid, thus protecting the trailing end of the foot rest 133.

Although the invention has been described in its preferred embodiment with a certain degree of particularity, it is to be understood that numerous changes can be made without deviating from the invention as hereinafter claimed.

What is claimed:

1. An improvement in a self propelled device having a fixed frame with a longitudinal axis, the improvement comprising a sulky stand, a wheel, means to connect said wheel to said sulky stand to support same for travel over the ground, a pivot frame, a horizontal "X" axis pivot means perpendicular to the longitudinal axis of the self propelled device to directly connect said pivot frame to the fixed frame of the self propelled device, said horizontal "X" axis pivot means allowing said pivot frame to move upwards and downwards in respect to the fixed frame of the self propelled device while minimizing longitudinal angular pivoting there between, means to connect said pivot frame to said sulky stand, a seat, means to support said seat to said sulky stand for fore and aft movement in respect to said sulky stand, a rod, means to connect said rod to the frame of the self propelled device, and means to connect said rod to said seat.

2. The improvement of claim 1 characterized by the addition of a vertical pivot means to connect said wheel to said sulky stand.

3. The improvement of claim 1 characterized by the addition of a foot rest, and means to connect said foot rest to the frame of the self propelled device.

4. The improvement of claim 2 characterized in that there are two wheels each connected to said sulky stand by a vertical "Z" axis pivot means respectively.

5. The improvement of claim 1 characterized by said means to connect said pivot frame to said sulky stand includes a horizontal "Y" axis pivot means to allow the sulky stand to float angularly sideways in respect to the frame of the device.

6. An improvement in a self propelled device having a fixed frame with a longitudinal axis, the improvement comprising a sulky stand, a wheel, means to connect said wheel to said sulky stand to support same for travel over the ground, a pivot frame, a horizontal "X" axis pivot means perpendicular to the longitudinal axis of the self propelled device to connect said pivot frame to the frame of the self propelled device, said horizontal "X" axis pivot means allowing said pivot frame to move upwards and downwards in respect to the fixed frame of the self propelled device while minimizing longitudinal angular pivoting there between, means to connect said pivot frame to said sulky stand, a seat, means to support said seat to said sulky stand for movement in respect to said sulky stand, an adjustment rod, means to connect said adjustment rod to the frame of the self propelled device, and means to connect said adjustment rod to said seat, a foot rest, and means to connect said foot rest to the frame of the self propelled device and said means to connect said pivot frame to said sulky being a horizontal pivot means of a "Y" axis pivot between said pivot frame and said sulky stand.

7. A sulky for a self propelled device having a frame, the sulky comprising a pivot frame, said pivot frame having two ends, a horizontal "X" axis pivot between one end of said pivot frame and the frame of the self propelled device, a sulky stand, means to connect said sulky stand to the other end of said pivot frame, at least one wheel, said at least one said wheel being connected to said sulky stand by a vertical "Z" axis pivot means to support same for travel over the ground, a seat, parallelogram link means to support said seat above said sulky stand for fore and aft movement in respect thereto, an adjustment rod, said adjustment rod having two ends, means to pivotally connect one end of said adjustment rod to the frame of the self propelled device, and means to pivotally connect the other end of aid adjustment rod to said seat.

8. The sulky of claim 7 characterized in that said means to connect said sulky stand to said other end of said pivot frame is a horizontal "Y" axis pivot.

9. The sulky of claim 8 characterized in that said sulky stand has two lateral sides and that there are two wheels, and said two wheels each connected to a lateral side of said sulky stand by a vertical "Z" axis pivot means respectively.

10. The sulky of claim 7 wherein the device has rearwardly extending handlebars extending towards said sulky stand, the handlebars having an end spaced from the frame by a first distance and characterized in that said vertical pivot means being located a second distance from the frame and said second distance being greater than the first distance.

11. The sulky of claim 7 characterized by the addition of a foot rest and means to connect said foot rest to the frame of the self propelled device.

12. The sully of claim 11 characterized in that said foot rest is intermediate between said horizontal "X" axis pivot and the frame of the self propelled device.

13. The sulky of claim 12 characterized by the addition of a quasi-cylindrical member at said horizontal "X" axis pivot to act as a skid.

14. A sulky for a self propelled device having a frame and rearwardly extending handlebars, the sulky stand comprising a foot rest, means to fixedly connect said foot rest to the frame of the self propelled device, a pivot frame, said pivot frame having first and second ends, said first end being interconnected to said frame by a horizontal "X" axis pivot to said foot rest, said sulky stand being connected to said second end of said pivot frame by a horizontal "Y" axis pivot, said sulky stand having two lateral sides, first and second wheels, said first wheel being connected by a vertical "Z" axis pivot means to one lateral side of said sulky stand, said second wheel being connected to the second lateral side of said sulky stand by a second vertical "Z" axis pivot means, an upper sulky frame, parallelogram link means to support said upper sulky frame above said sulky stand for fore and aft movement in respect thereto, an adjustment rod, said adjustment rod having two ends, means to pivotally connect one end of said adjustment rod to the frame of the self propelled device, means to pivotally connect the other end of said adjustment rod to said upper sulky frame, a seat, and means to affix said seat to said upper sulky stand.

15. An improvement in a self propelled device having a fixed frame with a longitudinal axis and handlebars, the improvement comprising a sulky stand, a wheel, vertical pivot means to connect said wheel to said sulky stand to support same for travel over the ground, a pivot frame, said pivot frame having a longitudinal axis, horizontal pivot means to directly connect said pivot frame to the frame of the self propelled device to allow said pivot frame to float upwards and downwards behind the handlebars with said longitudinal axis of said pivot frame not angularly horizontally pivoting in respect to the longitudinal axis of the self propelled device, means to connect said pivot frame to said sulky stand, a seat, means to support said seat to said sulky stand for fore and aft movement in respect to said sulky stand, a rod, means to connect said rod to the frame of the self propelled device, means to connect said rod to said seat.

16. The improvement of claim 15 characterized by said means to connect said pivot frame to said sulky stand includes a horizontal "Y" axis pivot means to allow the sulky stand to float angularly sideways in respect to the frame of the device.

17. The improvement of claim 15 characterized by the addition of a foot rest, and means to connect said foot rest to the frame of the self propelled device.

18. The sulky of claim 15 wherein the device has rearwardly extending handlebars extending towards said sulky stand, the handlebars having an end spaced from the frame by a first distance and characterized in that said vertical pivot means being located a second distance from the frame and said second distance being greater than the first distance.

19. The improvement of claim 15 characterized by said pivot frame is connected to the frame by said horizontal pivot means and by the addition of said means to connect said pivot frame to said sulky stand including a horizontal "Y" axis pivot means to allow the sulky stand to float angularly sideways in respect to the frame of the device.

\* \* \* \* \*